Feb. 7, 1950  C. H. WILLIAMS  2,496,765
SADDLE, STIRRUP, AND BEARING CONSTRUCTION
FOR SPINNING OR ROVING FRAMES
Filed Aug. 31, 1945  3 Sheets-Sheet 1

INVENTOR.
Charlton H. Williams
BY
Wilkinson & Mawhinney
Attorneys

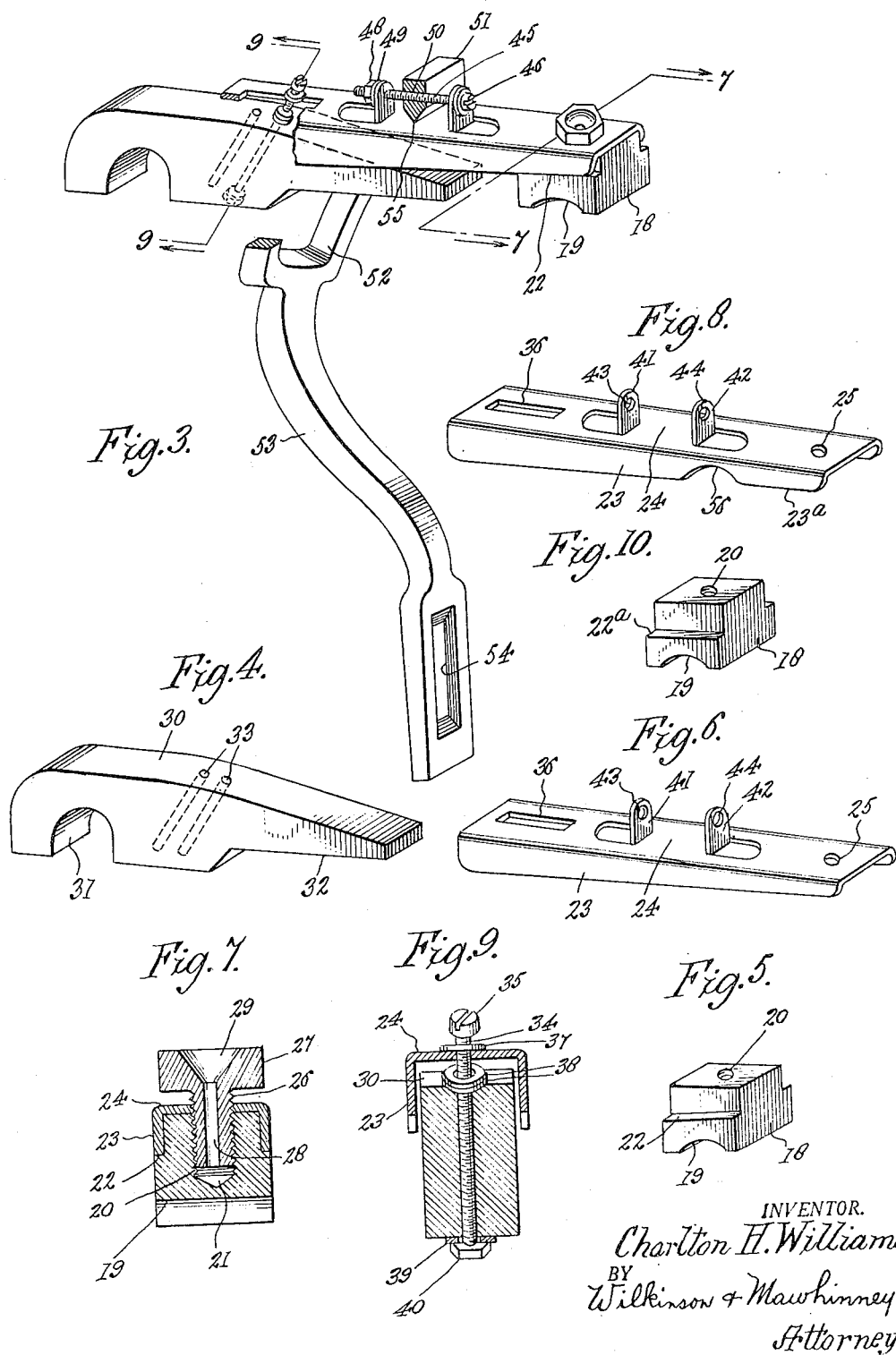

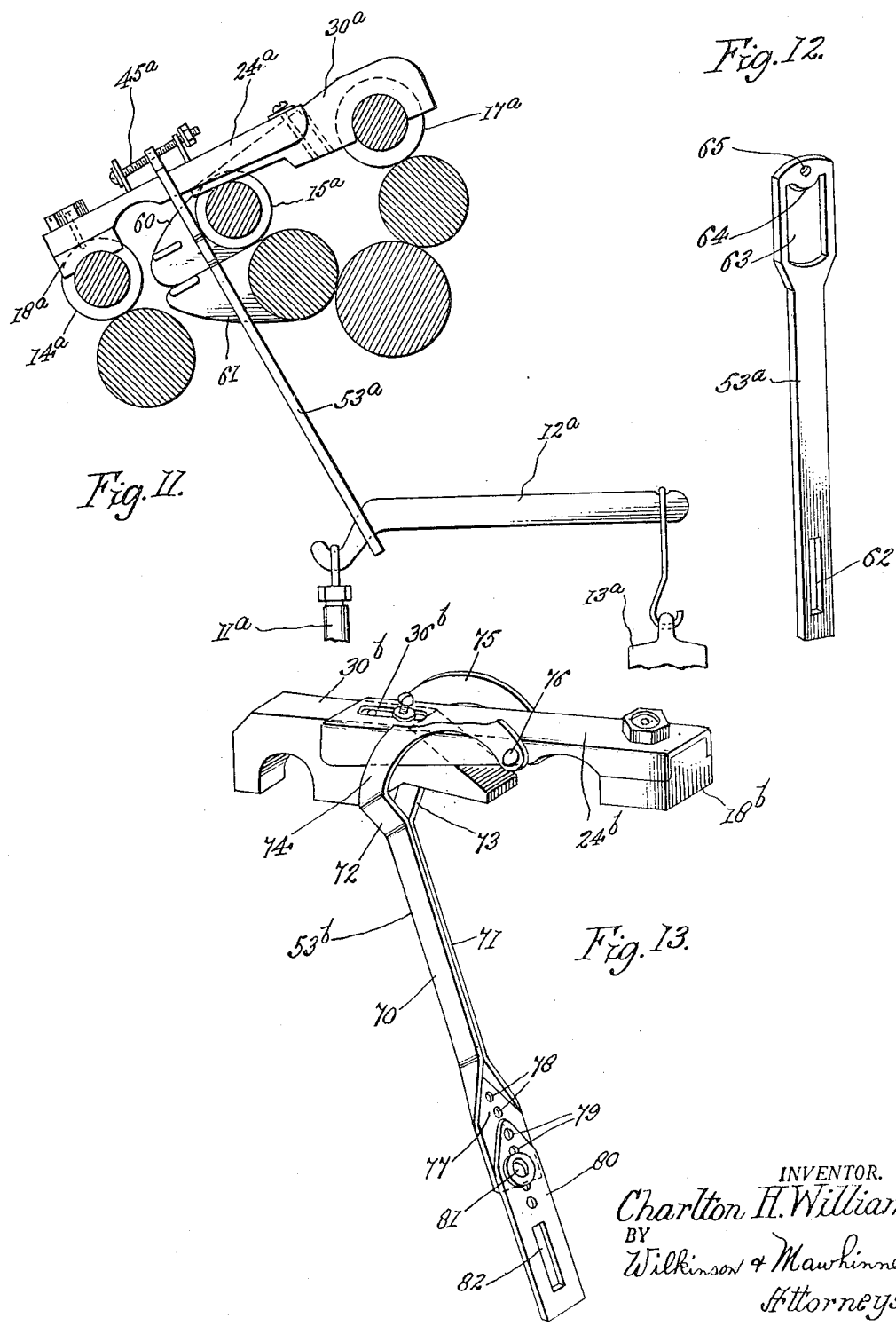

Patented Feb. 7, 1950

2,496,765

UNITED STATES PATENT OFFICE 2,496,765

SADDLE, STIRRUP, AND BEARING CONSTRUCTION FOR SPINNING OR ROVING FRAMES

Charlton H. Williams, Columbus, Ga., assignor to Eula W. Williams, Columbus, Ga.

Application August 31, 1945, Serial No. 613,832

6 Claims. (Cl. 19—136)

The present invention relates to improvements in saddle, stirrup and bearing constructions for spinning and roving frames, and is a continuation-in-part of my similarly entitled application Serial No. 474,142, filed January 30, 1943, now abandoned.

An object of the invention is to provide an improved method and means for applying weight to the top rolls of spinning and roving frames of any type, make or model, in which the matters of wear and friction of the roll parts and the bearings are dealt with in accordance with a new mechanical construction of bearings in combination with peculiarly formed saddle construction to cooperate with such novel bearing members and in a novel manner with the stirrup which is modified to cooperate in the new action between the saddle and the bearing members.

Another object of the invention is to provide improved bearing members of a self-lubricating character which will dispense with the necessity for capillary wicks heretofore employed to convey lubricant to the contact surfaces of the bearing members.

A further object of the invention resides in providing for replenishment of lubricant to the front bearing member in an internal manner, without the use of wicks, and preferably by means of the fastening which secures this front bearing member fixedly in the saddle.

The invention further contemplates individual improvements in the saddle, in each of the bearing blocks or members, and in the stirrup in so far as its engagement and adjustment with the saddle is concerned; the invention further involving in a more specific aspect certain adjusting facilities between the saddle and the combined rear and middle bearing block elements.

In a more specific aspect, but one which has been found exceedingly practical, it is a further object of the invention to provide a front bearing of a porous metal replenished by an internal fountain of lubricant supply, and a combined rear and intermediate bearing block of wood impregnated with lubricant and having respectively part-cyclindrical and flat bearing surfaces for the rear and intermediate rolls and in which provision is made for adjustment with the metallic inverted U-shaped saddle member.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a fragmentary vertical section taken through the roll stand of a spinning or roving machine showing the improved device according to the invention as mounted in place in a condition of use, Figure 2 is a perspective view, with parts broken away and parts shown in section, looking down upon the rolls and showing the improved device applied to the necks thereof, Figure 3 is also a perspective view, taken on an enlarged scale, with part of the stirrup and a part of the metallic saddle broken away and shown in section, of the improved device apart from the rolls, Figure 4 is a perspective view of the combined rear and intermediate roll bearing, preferably made of wood.

Figure 5 is a perspective view of the metallic front bearing,

Figure 6 is a perspective view of one form of metallic saddle employed,

Figure 7 is a vertical transverse section taken on the line 7—7 in Figure 3,

Figure 8 is a perspective view of a slightly modified form of metallic saddle,

Figure 9 is a cross section taken on the line 9—9 of Figure 3,

Figure 1:
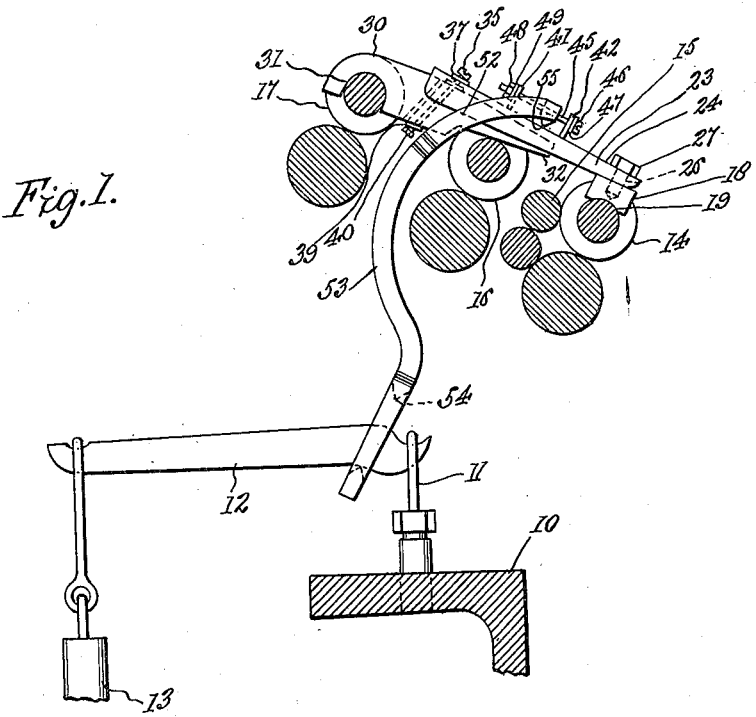
Figure 2:
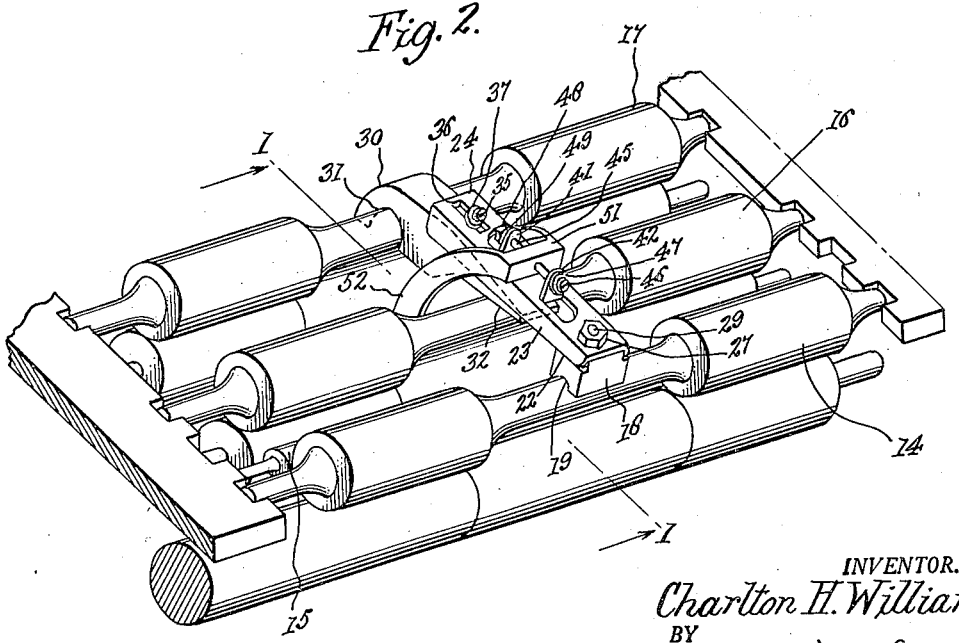

Figure 10 is a perspective view of a slightly modified form of front bearing block having straight flanges without the angle, Figure 11 is a view similar to Figure 1 but showing a modified form of the invention in which the straight stirrup is employed instead of the curved stirrup, Figure 12 is a perspective view of a form of straight stirrup employed, and Figure 13 is a perspective view of a further modified form of the device in which the stirrup is directly pivoted without adjustment to the saddle.

Referring more particularly to the drawings, 10 designates a part of the framework of a spinning or roving frame, for instance the roller beam which carries the adjustable fulcrum eye 11 in which the weight lever 12 is fulcrumed. Cast iron or other weight is indicated at 13. The front top roll is indicated at 14, the second top roll at 15, the third top roll at 16 and the fourth top roll at 17.

Referring more particularly to Figure 5, the neck of the front top roll 14 is adapted to receive a bearing block 18 of metal which is preferably self-lubricating and comprises a porous metal embodying lubricant and having capillary or other pores distributed throughout its mass for receiving further supplies of lubricant as the original absorption supply diminishes. This bearing block 18 is made with a part cylindrical contact surface 19 and with a threaded socket 20 which opens upwardly through the upper edge of the block 18 and continues downwardly preferably to a low point in the block 18 adjacent to the bearing contact surface 19, as shown in Figure 7, the bottom 21 of the socket being preferably in the form of an inverted cone to increase the accessibility of the oil or lubricant to the pores of the block 18 and to bring the bottom as close to the external bearing surface 19 as feasible, regard being had for the total amount of wear that the bearing block 18 is calculated to withstand before wearing through to such bottom 21.

Laterally or transversely the block 18 will be wider at its lower portion to provide sloping shoulders 22. These shoulders 22 snugly receive the lower edges of the forward portions of depending flanges 23 on the sheet metal saddle member 24.

Referring more particularly to Figure 6 a form of saddle member 24 is shown in which the flanges 23 are higher or deeper at the rear end of the saddle and diminish progressively in a forward direction.

As shown in Figure 7 the width of the front bearing block 18 above shoulders 22 is such that the side flanges 23 of the saddle 24 snugly embrace the same to avoid rotation or movement of the block 18 in the saddle. This object is also served by the snug engagement of the free edges of the flanges 23 along the sloping shoulders 22.

Reverting to Figure 6, in its upper wall, the saddle 24 is provided forwardly with a perforation 25 adapted to register with the socket 20 of the front bearing block 18 to admit a fastening such for instance as the screw having the externally threaded shank 26 and the head 27, which may be polygonal or otherwise formed to take a wrench or other instrument for the purpose of tightening the head 27 down against the upper surface of the metallic saddle 24.

As shown in Figure 7 the screw shank is hollow or traversed throughout its length by a bore 28 which opens at its bottom through the lower end of the screw shank 26 and communicates with the interior bottom space 21 of the socket 20 in the front bearing block 18. At its upper end the bore 28 communicates with a hopper cavity 29 in the head of the nut 27. This hopper cavity 29 is wider at its upper end which opens through the upper part of the screw head 27 and converges downwardly to the upper end of the duct or bore 28. The lower portion of the socket 20, the entire length and cross section of the bore 28, and such part of the hopper cavity 29 as will retain liquid in the inclined position indicated in Figure 1, combine to constitute a reservoir for oil or an appropriate lubricant at all times maintained in sufficient body and amount internally of the front bearing block 18 to satisfy the requirements of the porous metal to establish a self-lubricating bearing. As fast as the friction between the rotating roll neck and the bearing surface 19 withdraws and diminishes the absorbed supply of lubricant distributed throughout the bearing block 18, new supplies will be automatically drawn into the capillary ducts of the metallic block 18 from the reservoir. Exhaustion of lubricant from the bearing block 18 will not occur for a long period of time, and attention to this detail, except at rare intervals to replenish the reservoir, is relieved to a great extent, and together with it well known disadvantages occurring with worn out, burned out and unevenly wearing bearings.

Referring more particularly to Figure 4, the rear and intermediate bearings are provided for in a single, preferably integral, bearing block 30 having a part cylindrical contact surface 31 for the neck of the rear or fourth top roll and with a flat bearing surface 32 for the neck of the third top roll. This combined bearing block 30 is preferably made of wood of a porous character impregnated with oil or other lubricant so as to be self-lubricating. Between the bearing surfaces 31 and 32 the block 30 is traversed from top to bottom by one or more, preferably two, holes 33 to selectively receive a bolt 34. This bolt 34 has a head 35 projecting above the saddle 24 and preferably having a usual cross slot to receive a screw driver or other implement by which the threads on the shank 34 of the bolt may be rotated in engagement with the threads of the bolt hole 33 in order to cause such enlarged head 35 to move up or down in relation to the top of the block 30 and the top of the saddle 24. The shank 34 projects up through a slot 36 in the rear portion of the saddle 24, a washer 37 being loosely mounted between the head 35 and the top of the saddle 24, both washer 37 and head 35 being wider than the width of the slot 36. Below the saddle and above the bearing block 30 one or more, for instance two washers or space members 38 surround the shank of the bolt 34, these washers 38 being sufficiently wide to prevent the same passing upwardly through the saddle slot 36. This slot 36 is elongated in the direction of length of the saddle 24.

At its lower end the bolt 34 receives one or more washers 39 and a nut 40.

Referring again to Figure 6, ears or lugs 41 and 42 are struck up from the sheet metal of the top wall of the saddle 24 as a convenient and economical method of production; although such ears or lugs may be provided upon the saddle in any other manner. In the lugs are punched or otherwise produced holes 43 and 44 of a size somewhat larger than the adjusting threaded bolt 45 which is suspended therebetween in a manner free to rotate. The head 46 of the bolt 45 may be provided with a cross slot or other configuration for receiving a screw driver or other appropriate tool whereby the bolt 45 may be rotated. Both the bolt head 46 and washer 47 preferably associated therewith are larger than the opening 44 in the lug 42.

The other end of the bolt 45 carries a nut 48 threaded thereon and preferably a washer 49 interposed between the nut and the lug 41. The nut at one end and the head at the other end prevent the bolt 45 from becoming disengaged with the lugs 41 and 42. The intermediate portion of the threaded bolt 45 is threadedly engaged with a threaded opening 50 made through the upper bar 51 of the yoke 52 on the curved or other stirrup 53. The lower end of the stirrup may be provided with a customary slot 54 to engage the lever 12. The upper yoke bar 51 which extends above the saddle 24 and between the lugs 41 and 42, is so formed as to provide a knife edge 55 on its lower side adapted to contact and readily oscillate upon the upper side of the saddle 24. The stirrup may thus rock on the saddle, such movement being permitted by the oversize holes 43 and 44. In other words the diameters of the holes 43 and 44 are greater than the diameter of the bolt 45. The bolt 45 has no threaded engagement with the walls of holes 43 and 44. Rotation of the bolt 45 in one direction will cause the yoke bar 51 to progress along the threads toward one lug, while rotation of bolt 45 in the opposite direction will cause yoke bar 51 to progress toward the opposite lug. The bolt 45 therefore provides for a shift of the fulcrum 55 in relation to the top of the saddle 24 and in relation to the length of the saddle.

In operation, the weight 13, through lever 12 and stirrup 53 will be imposed on the saddle through the yoke bar 51 along a transverse line defined by the knife edge 55. The weight devolving on the metallic saddle 24 will be imposed by it upon the front bearing 18 and the rear and intermediate bearings 31 and 32. The downward pressure movement of the saddle 24 directly carries with it the rigidly held front bearing block 18. As to the rear and intermediate bearing block 30, the pressure is communicated to the same through the stand or bank of washers 38, which forms a loose fulcrum on which the saddle 24 may pivot in a vertical plane with respect to the rear and intermediate bearing block 30. Such bearing block has a rounded and sloping surface to permit of a free vertical play with respect thereto by the saddle 24 without interference by the block 30. The elevation of saddle 24 above block 30 produced by the stand of washers 38 or other appropriate means also gives greater clearance for such full vertical play.

At the same time the saddle 24 is held captive by the bolt head 35 and washer 37. The threaded shank 34 of the bolt may be so engaged with the threads of one of the openings 33 in the combined rear and intermediate bearing block 30 as to space the head 35 a sufficient distance above the upper surface of the block 30 and above the upper part of the stand of washers 38 as to permit of freedom of rocking movement of the saddle 24 on the bolt 34, the elongation of the slot 36 contributing to this free vertical play and levering movement of the saddle 24; at the same time placing limits upon the movement, and an adjustment to change the limits by the simple expedient of applying a screw driver to the bolt head 35 and turning it in one or the other direction to enlarge or diminish the relative play and movement of the saddle 24 with reference to the bearing block 30.

The elongation of slot 36 will also permit the saddle 24 to shift longitudinally with respect to the block 30. This permits a compensating movement by the bearing blocks 18 and 30 relatively to one another to enable the blocks to at all times assume correct positions with respect to the necks of the top rolls which they engage. Contributing to this compensating action are the concavities 19 and 31, which serve to locate the front bearing block upon its roll neck and the rear portion of the block 30 upon its particular roll neck. These concavities further serve to maintain the bearing blocks in this particular position while the flat bearing surface 32 enables the block 30 to be formed in one piece without maladjustment of the bearing 32 upon its particular neck. This flat bearing surface 32 allows for compensation for wear in the concavity 31 which might otherwise disturb the relative alignment of the two bearings 31 and 32.

Thus the front bearing block 18 may be adjusted to its roll neck independently of the rear bearing block 30. At the same time due to pressure and wear, sometimes irregularly in the various bearing faces 19, 31 and 32 these bearing faces may be kept accurately up to the roll necks respectively engaged and may at all times receive the pressure of the weight 13 through the saddle 24.

By adjusting the bolt 45 the knife edge 55 may be shifted forwards and backwards along the saddle 24 so as to shift the application of the weight in accordance with wear and friction conditions and the requirement for pressure between the roll pairs or uniformity of such pressure.

Preferably more than one threaded opening 33 is provided in the duplex bearing block 30 in order to change the fulcrum point provided by the bank of washers 38. This will change the leverage of the saddle 24 and it will also at the same time change the point of application of weight pressure upon the duplex bearing block 30. If it is desired to apply greater pressure at the concavity 31 rather than upon the flat bearing surface 32, the threaded bolt 34 may be removed from the right hand opening 33 and engaged with the left hand opening. As many openings 33 may be provided as found necessary.

The bearing blocks 18 and 30 will be both self-lubricating. It has been found in practice that with an assembly such as provided by the stirrup and saddle a front bearing 18 made out of porous metal constantly replenished with lubricant, and a rear combined or duplex bearing 30 of lubricant-impregnated wood contribute surprisingly to the combination to produce long life, uniform wear and uniform pressure upon the rolls with a minimum of attention on the part of the operative.

Referring to Figure 8, the construction of the saddle is the same as shown in Figure 6 except for the dips or incurved portions 56.

The two bearing blocks float in the saddle, and the weight does not influence the movement of the blocks either together or apart. The weight is transferred to the blocks at the theoretically ideal locus, namely at the central portions for equal distribution to all surfaces.

The duplex bearing block may rock in a vertical plane upon the underside of the saddle in obeying movements which compensate for bearing fitting and resulting wear of the bearing surfaces and necks of the top rolls. This rocking movement occurs where the fulcrum contacts the underside of the saddle. In other words the fulcrum functions to permit of relative rocking movement of both saddle and duplex bearing block, and at the same time allows relative longitudinal shifting movement of either of these parts. The upper surface of the duplex block is shaped to this end, and wood is found to be surprisingly apt material in such a situation. The hard metal bearing block at the front forms a fulcrum fast with the saddle which forms a lever of the saddle and duplex block. The duplex block of softer material is at the free or work end of this lever, and the weight means acts on the hard metal front block to maintain the fulcrum as fixed and permanent as possible with wear occurring only very slowly and with the lubrication feature establishing the front fulcrum as permanently as possible and with as little cocking or eccentric wear as possible. The softer duplex block cooperates in that it does not compete in wear with the front block but allows the front block to always maintain that relative permanency which will preserve the lever relationship above described. Thus the metal and wooden blocks in the relative positions described cooperate in a manner which reduces wear in both, and prevents cocking and unevenness in wear.

The particular form of the knife edge weight-imposing bar with its floating and rocking adjustment provides only line contact of the knife edge with the top surface of the saddle in a transverse direction which results in no interference with the leverage action of the entire device about the front bearing as a major fulcrum, or the individual rocking movement of saddle or duplex bearing block, or both, about the minor fulcrum. The weight and its connections may yield upwardly at times when the pressure exceeds the selected weight so that weight imposition will not interfere with lever action or any of the parts about either fulcrum. The longitudinal shifting of the knife edge toward and from both major and minor fulcrums secures regulatory fulcrum action at the ideal point namely at the locus of weight imposition. In the present construction this adjustment simultaneously affects both fulcra.

The inclination given the screw holes in the duplex block coincides with the slope of the top rolls in the roll stand and agrees with the inclination which the saddle assumes on the roll stand. It brings the bolt head and washer into substantial parallelism with the top surface of the saddle.

It will be appreciated by those skilled in the art that the new construction is applicable to spinning frames having backcenters of $1\frac{9}{16}''$ or $1\frac{7}{8}''$.

Conversely to what has been said the screw adjustment associated with the stirrup may be regarded as a means for shifting the saddle and its bearing assembly forwards or rearwards, changing the relative distance between the front and middle and front and back bearings. If such screw adjustment is not sufficient adjustment for roll centers, then the fulcrum bolt is removed from one hole to another in duplex block; and fine adjustment is made with the screw on top of saddle bearing holder.

By removing the fulcrum bolt the saddle and duplex block may be separated.

By the use of screw threads in the duplex block holes and the nut and washer the chance of any movement up or down of the screw is checked. The purpose of the holes is to make the saddle as flexible as possible. Additional holes may be bored to fit any textile mill's desires.

The holes in the wooden piece make it impossible for spinners to wrongly place the saddle onto the rolls, for the saddle will not fit on the frame unless the bolt is in the correct hole, namely the hole nearest the front roll bearing for $1\frac{7}{8}''$ back centers, and the hole nearest the rear bearing for $1\frac{9}{16}''$ back centers. The improved saddle with bearings as designed and fully assembled is fool proof as far as placement of saddle in proper position on frame is concerned.

With bolt in the proper hole the saddle can actually be tossed onto the frame top falling naturally into position. Learner spinners cannot misplace bearings thereby burning out rolls and bearings.

Referring more particularly to Figure 10, a slightly modified form of front bearing block is shown which may be used with the type of metal holder shown in Figure 8.

In this form the front bearing block is without the angular arrangement of the shoulders or flanges and the receptacle in the front portion of the holder is broadened so as to fit a straight edge bearing. The straight broadened receptacle walls 23$^a$ cooperate with the straight flanges 22$^a$ on the front bearing block. With the straight flanges on the front bearing, the bearing becomes more versatile in that it may be placed in holder without regard to front and rear surfaces.

Referring more particularly to Figures 11 and 12, the invention is shown applicable to a straight stirrup.

In Figure 11 the adjustable fulcrum eye on the roll stand is indicated at 11$^a$, the weight lever at 12$^a$ and the weight at 13$^a$. The front top roll 14$^a$ and the fourth top roll 17$^a$ are similar to the rolls in the previous illustration but the second top roll 15$^a$ is associated in a well known manner with the long draft Casablancas belts 60 and 61.

In this instance the saddle 24$^a$ fixedly carries the front bearing block 18$^a$ and the rear duplex bearing block 30$^a$. In other words this saddle 24$^a$ is similar to the saddle in the previous illustration and supports a similar threaded adjusting bolt 45$^a$ which cooperates with the straight stirrup 53$^a$.

Referring more particularly to Figure 12 in which this straight stirrup 53$^a$ is more fully illustrated, 62 designates an elongated slot in the lower end portion of the straight stirrup 53$^a$ for membering with the weight lever 12$^a$. At its upper portion the straight stirrup 53$^a$ is cutaway or formed with an opening 63 adapted to span or straddle the stirrup 24$^a$. The upper bar of this opening 63 is made with a convex rounded lip or fulcrum 64 for rollingly engaging the upper surface of the saddle 24$^a$. A threaded perforation 65 in the straight stirrup 53$^a$ above the lip 64 is engaged with the threads on the adjusting bolt 45$^a$, so that rotation of the bolt will shift the stirrup 53$^a$ forward or backwards longitudinally of such stirrup 24$^a$.

This particular construction is for use on the Whitin and various other make frames where it is necessary for the stirrup to pass between the first and second top rolls instead of between the more commonly prevalent third and fourth rolls.

This arrangement allows an adjustment horizontally through the head of the stirrup by means of the screw attachment 45$^a$; consequently such arrangement has an advantage over a stirrup capable only of dead weighting the saddle as the new arrangement provides an adjustment for regulating the point where the weight becomes effective.

Referring more particularly to Figure 13, a similar front bearing 18$^b$ is fixed in a similar form of saddle 24$^b$ similarly connected with a form of duplex or combined rear and intermediate bearing 30$^b$. In this case the stirrup 53$^b$ is of a type suitable for the Saco-Lowell spinning frame and may conveniently be made from sheet metal having its intermediate or shank portion folded together on a longitudinal median line with the side walls 70 and 71 brought together in parallelism and welded together. The head of the stirrup is bifurcated as shown by the divergent necks 72 and 73 and the curved bars 74 and 75 extending on opposite sides of the saddle and being movably secured thereto at the free ends of the bars 74 and 75 by the cross pivots 76.

The lower end portion of the stirrup is formed into a flat web 77 having a vertical series of perforations or holes 78 adapted to register with a similar series of perforations or holes 79 in a foot-piece 80 which is detachable from the stirrup and secured thereto by an appropriate fastening 81, for instance by a screw and nut with preferably a washer interposed between the screw head and the foot-piece 80. A slot 82 in the foot-piece 80 provides for engagement with the weight lever.

In this form of the invention the stirrup is adjustable to various roll stand heights. By withdrawing the fastening 81 the foot-piece 80 may be shifted up and down until the correct length of stirrup is arrived at whereupon the fastening 81 is restored through the perforations 78 and 79 which at that time happen to register with one another. Conventional saddles require a new casting or stamping for each roll stand height.

It will also be noted that in this form of the invention the horizontal screw 45 has been eliminated which makes cleaning easier for the operator while the flexibility remains unchanged due to the fact that the slot 36ᵇ in the rear portion of the inverted U-holder 24ᵇ allows self-adjustment.

It is obvious that various changes and modifications may be made in the details of construction and design of the above specifically described embodiment of this invention without departing from the spirit thereof, such changes and modifications being restricted only by the scope of the following claims:

What is claimed is:

1. In spinning, roving and the like frames, in combination with a roll stand, a pressure device comprising a saddle having a rear slotted portion, a front bearing immovably carried by the forward portion of said saddle, a rear bearing block having a plurality of diagonally disposed internally threaded openings vertically therethrough, a threaded headed bolt selectively engaged with the threads of one of the series of threaded diagonal openings with the head upstanding in spaced relation above the upper end of the rear bearing block, the upper portion of the bolt extending through the slot in the saddle and said head lying in spaced relation above the saddle and being wider than the saddle slot, said bolt and openings providing a vertically adjustable and selective fulcrum above said rear bearing block on which the slotted rear portion of the saddle fulcrums, and means for imposing weight on the intermediate portion of the saddle.

2. In a spinning, roving or the like frame, in combination with a roll stand having three pairs of rolls, a pressure device comprising a front bearing for communicating pressure to the first pair of rolls, a combined rear and intermediate bearing for communicating pressure to the second and third pair of rolls, a saddle affixed to the front bearing and having a fulcrum support on the combined bearing, that portion of the combined rear and intermediate bearing lying beneath the saddle being cut-away to permit the saddle to move up and down relatively to the combined bearing and to rock longitudinally on said fulcrum, said saddle having a longitudinal slot in its rear portion, regulating means carrying said fulcrum and adjustable longitudinally of said combined bearing and having a part projecting up through said longitudinal slot with a screw slotted head at its upper end wider than said slot and spaced above said fulcrum a greater distance than the thickness of the saddle to permit the saddle to rock on said fulcrum without interference from said head and to slide longitudinally along said fulcrum, a stirrup having a yoke bar at its upper portion overlying the intermediate portion of said saddle and having a transverse knife edge on the lower side of the yoke bar permitting relative vertical pivoting movement between the saddle and stirrup, said yoke bar having a threaded opening therethrough, and a rotatable non-sliding screw shaft engaging the threads of said yoke bar and carried by the intermediate portion of said saddle to adjust the saddle longitudinally with respect to the stirrup and combined bearing.

3. In a spinning, roving or the like frame, in combination with a roll stand having three pairs of rolls, a pressure device comprising a front bearing for communicating pressure to the first pair of rolls, a combined rear and intermediate bearing for communicating pressure to the second and third pair of rolls, a saddle affixed to the front bearing and having a fulcrum support on the combined bearing, that portion of the combined rear and intermediate bearing lying beneath the saddle being cut-away to permit the saddle to move up and down relatively to the combined bearing and to rock longitudinally on said fulcrum, said saddle having a longitudinal slot in its rear portion, regulating means carrying said fulcrum and adjustable longitudinally of said combined bearing and having a part projecting up through said longitudinal slot with a screw slotted head at its upper end wider than said slot and spaced above said fulcrum a greater distance than the thickness of the saddle to permit the saddle to rock on said fulcrum without interference from said head and to slide longitudinally along said fulcrum, and a stirrup connected to an intermediate portion of said saddle.

4. In a spinning, roving or the like frame, in combination with a roll stand having three pairs of rolls, a pressure device comprising a front bearing for communicating pressure to the first pair of rolls, a combined rear and intermediate bearing for communicating pressure to the second and third pair of rolls, a saddle affixed to the front bearing and having a fulcrum support on the combined bearing, that portion of the combined rear and intermediate bearing lying beneath the saddle being cut-away to permit the saddle to move up and down relatively to the combined bearing and to rock longitudinally on said fulcrum, said saddle having a longitudinal slot in its rear portion, regulating means carrying said fulcrum and adjustable longitudinally of said combined bearing and having a part projecting up through said longitudinal slot with a head at its upper end wider than said slot and spaced above said fulcrum a greater distance than the thickness of the saddle to permit the saddle to rock on said fulcrum without interference from said head and to slide longitudinally along said fulcrum, a stirrup having a yoke bar at its upper portion with a convex lip adapted to rock laterally on an intermediate portion on said saddle, and means carried by said saddle and engaging said yoke bar to relatively adjust the saddle and stirrup in a direction longitudinally of the saddle.

5. In a spinning, roving or the like frame, in combination with a roll stand having three pairs of rolls, a pressure device comprising a front bearing for communicating pressure to the first pair of rolls, a combined rear and intermediate bearing for communicating pressure to the second and third pairs of rolls, a saddle affixed to the front bearing and having a fulcrum support along its rear edge on said combined bearing, that portion of the upper surface of the combined bearing beginning substantially at the fulcrum support being cut-away forwardly and downwardly from the fulcrum support to permit the saddle to pivot vertically up and down relatively to the combined bearing about its rear edge fulcrum thereon, the rear portion of said saddle having a slot extending longitudinally thereof, a threaded bolt carried by the combined bearing and projecting up loosely through said slot, adjustable stop members carried by said bolt in spaced relation above and below the saddle and being wider than the width of said slot, a stirrup having a yoke bar at its upper portion overlying the intermediate portion of said saddle forwardly of said slot, said intermediate portion having a transverse knife edge engaging the upper surface of the saddle, said yoke bar having a threaded opening, and a rotatable non-sliding screw shaft engaging the threads of said yoke bar and carried by the intermediate portion of said saddle to adjust the saddle longitudinally with respect to the stirrup and combined bearing.

6. A pressure device as claimed in claim 5 characterized by the fact that said saddle has depending flanges flanking both the front and the combined bearing for preserving the alignment of the bearings relative to the saddle.

CHARLTON H. WILLIAMS.

REFERENCES CITED

The following references are of record in the file of this patent:

UNITED STATES PATENTS

| Number | Name | Date |
|---|---|---|
| 352,634 | Taylor | Nov. 16, 1886 |
| 784,276 | Pierce | Mar. 7, 1905 |
| 898,919 | Pierce | Sept. 15, 1908 |
| 912,651 | Dixon | Feb. 16, 1909 |
| 1,176,756 | Houghton | Mar. 28, 1916 |
| 1,186,066 | Bache | June 6, 1916 |
| 1,246,841 | Bache | Nov. 20, 1917 |
| 1,623,688 | Lawton | Apr. 5, 1927 |
| 2,249,408 | West | July 15, 1941 |
| 2,300,188 | West | Oct. 27, 1942 |
| 2,387,703 | Jones | Oct. 23, 1945 |